United States Patent [19]  
Martin

[11] 3,878,503  
[45] Apr. 15, 1975

[54] DECORATIVE STRUCTURE UTILIZING OPTICAL FIBERS
[75] Inventor: Edward C. Martin, Oxnard, Calif.
[73] Assignee: International Fiber Optics, Oxnard, Calif.
[22] Filed: Jan. 31, 1974
[21] Appl. No.: 438,216

[52] U.S. Cl. .............................. 240/10 L; 240/1 LP
[51] Int. Cl. .............................................. F21p 1/02
[58] Field of Search ........................ 240/1 LP, 10 L

[56] References Cited
UNITED STATES PATENTS
3,681,592  8/1972  Hugelshofer ...................... 240/1 LP
3,766,374  10/1973  Fairchild ........................... 240/10 L Primary Examiner—Samuel S. Matthews
Assistant Examiner—Russell E. Adams, Jr.
Attorney, Agent, or Firm—Limbach, Limbach & Sutton

[57] ABSTRACT

A decorative structure includes a plurality of optical fibers which are grouped together at one end which is placed in proximity with a light source so that light is transmitted through the optical fibers. The optical fibers are contained and supported by a bendable wire which is spirally wound around the plurality of optical fibers. To give a multiple-branched appearance, subgroups of optical fibers branch off from the main group of fibers. These branches are also supported and contained by spirally wrapped bendable wires.

5 Claims, 2 Drawing Figures

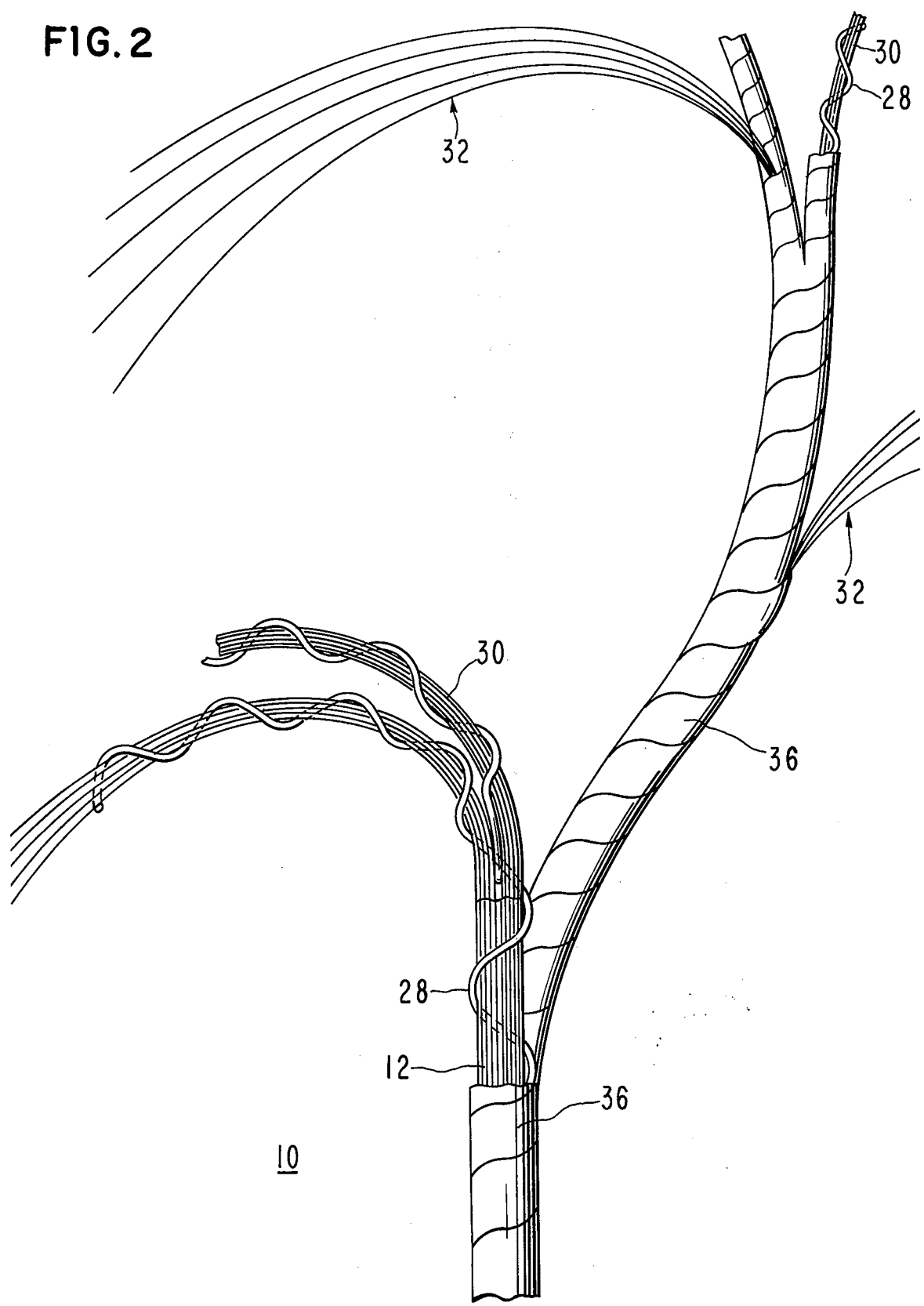

DECORATIVE STRUCTURE UTILIZING OPTICAL FIBERS

BACKGROUND OF THE INVENTION

The present invention relates to a decorative structure utilizing optical fibers and, in particular, a multiple-branched fiber optical display.

In recent years optical fibers have found many applications in commercial, scientific and other technical applications, as well as a component in decorative structures.

The particular property of optical fibers which makes them aesthetically attractive for decorative applications is their ability to efficiently transmit light along their length. A very light or glowing effect results along the length of each fiber coupled with a brilliant spot or light point source at its tip.

In some decorative structures, the optical fibers are held in such a manner that they are substantially unsupported along most of their length. In other words, they are supported in a "free-form" mode. In other applications, the structure is additionally provided with structural rods to which the optical fibers are attached so that the optical fibers are forced to assume the position of the structural rod which is bendable into any position desired.

One example of such a decorative structure is described in U.S. Pat. No. 3,766,374. In that patent, a decorative structure is described wherein the plurality of support rods are interspersed with a plurality of optical fibers. Branches are formed by branching off both structural rods and sub-groups of optical fibers. The optical fibers are secured to the support rod by means of tape.

The above described decorative structure has, however, several significant limitations and disadvantages. First, when the structural rods are initially inserted and intermingled with the plurality of optical fibers, it is very easy for the rod ends to damage the optical fibers. Optical fibers are either made of plastic or glass and include a central core having a different index of refraction from an outer sheath. They are extremely small in diameter and delicate and it is very easy for the support rods to permanently damage one or more of the optical fibers.

Secondly, the support rods of this device afford little protection to the optical fibers themselves. While tape or other covering is provided around the combination of the optical fibers and support rods, this covering does little to protect the optical fibers themselves from damage.

Third, the support rods do little to confine the optical fibers. This function is largely performed by the tape referred to in the previous paragraph.

Finally, some adhesives used with tape chemically attack the plastic from which the optical fibers are made. Thus, where the optical fibers are attached to the structural rod by means of tape, it is possible for the optical fibers to be damaged or destroyed.

SUMMARY OF THE INVENTION

It is therefore an object of the present invention to provide an improved decorative structure utilizing optical fibers.

Another object of the invention is to provide a simple, multiple-branched, decorative structure which can be built and constructed by an untrained person to hold the optical fibers forming the structure in position with a minimum of effort and thus insure a more consistant product for a kit or craft unit.

Another object of the invention is to provide an improved support for groups of optical fibers forming a multi-branched decorative structure whereby the optical fibers are both supported, confined and protected without the necessity of utilizing tape or other equivalent material.

In accordance with the present invention, a decorative multiple-branched structure is provided having a plurality of optical fibers with one end thereof grouped together and mounted in close proximity to a light source.

Light from the light source is directed into the grouped end of the optical fibers and then transmitted along the length of the optical fibers. Means are provided for supporting and confining the plurality of optical fibers by means of a bendable wire or rod spirally wound around the plurality of optical fibers beginning at the end of the optical fibers in proximity to the light source.

To construct a multiple-branch, decorative structure, sub-groups of the optical fibers may "branch off" from the main group of optical fibers. These sub-groups of optical fibers are likewise held and confined by spirally wound bendable wires. In a similar manner, further sub-branches may be constructed from the branches, and so forth.

The spirally wound, bendable wire not only supports the optical fibers but also acts to confine and protect the optical fibers. While it may be desirable from an aesthetic standpoint to provide an outer covering over the spirally supported optical fibers, this is not necessary either to support the optical fibers or to protect them. In other words, once the structure is constructed using the spirally wound, bendable wires, the structure is thereafter self-supporting. The structure is therefore not dependent upon the use of tape either for holding the optical fibers to a support or for surrounding and confining the optical fibers.

BRIEF DESCRIPTION OF THE DRAWINGS

FIG. 2 is a more detailed view of several of the branches of the decorative structure of FIG. 1.

DESCRIPTION OF THE PREFERRED EMBODIMENTS

Figure 1:
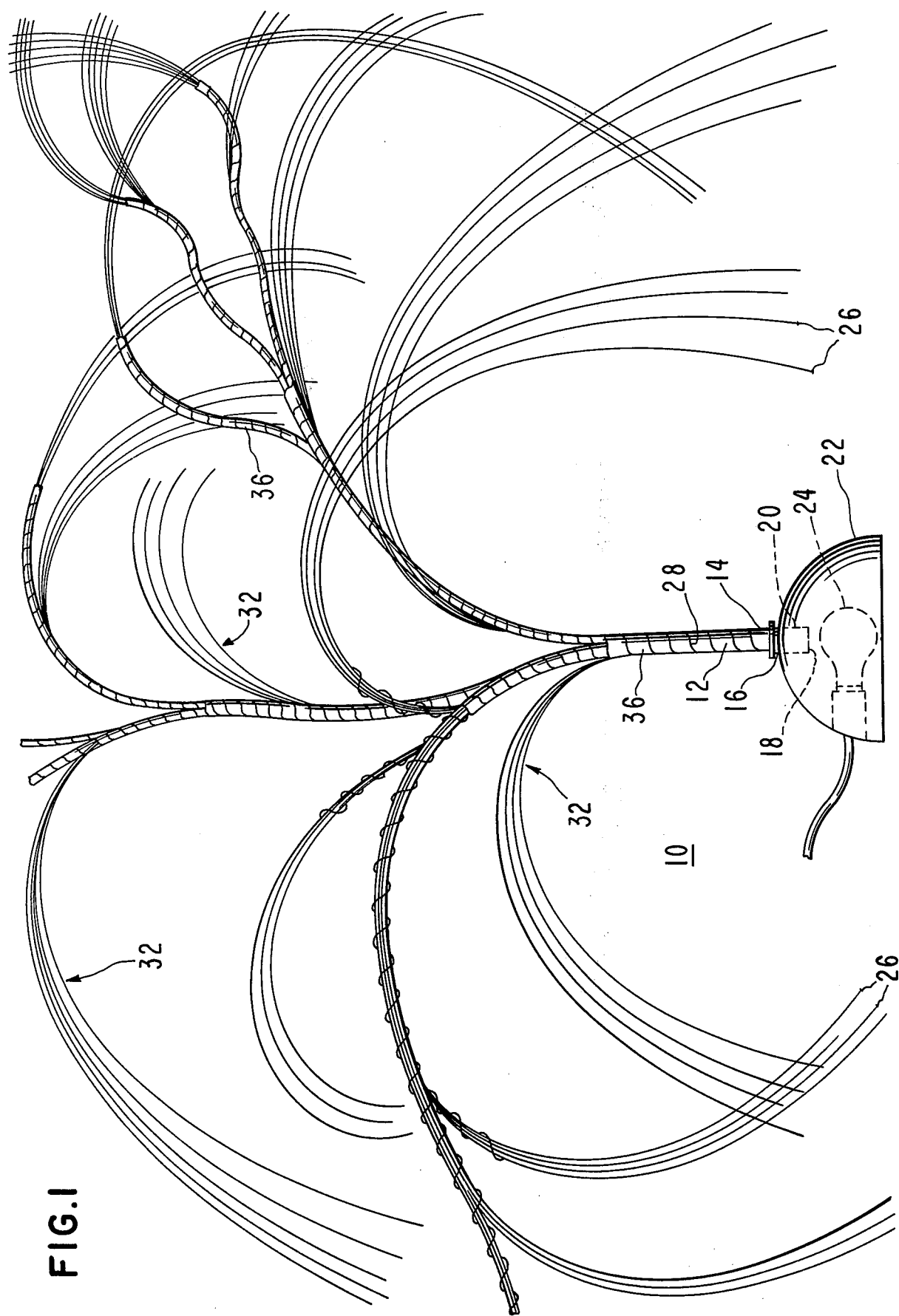
FIG. 1 is a pictorial representation of a multiple-branched, optical fiber decorative structure wherein the optical fibers are supported and confined in accordance with the present invention.

FIG. 1 is a pictorial representation of a multi-branched optical fiber structure 10 in accordance with the present invention. One end 14 of a plurality of optical fibers 12 are grouped together by suitable means such as a support thimble 16. Thimble 16 is open at one end 18 thereof so that the optical fiber ends are not obstructed. The thimble support 16 fits into a receptacle or well 20 which is formed in a base structure 22.

Contained within the base 22 is a light source 24. As can be seen, the grouped end 14 of the optical fiber bundle 12 is arranged so that it is in proximity to the light source 24. In this manner, light from the light source 24 is conducted through the open end 18 of the support thimble. Light is thereafter transmitted through the optical fibers causing a slight glow along the uncovered length of the optical fibers and resulting in a bright spot or point source of light at the tips 26 of the optical fibers. It is this combination of lighting effects which is one of the reasons which makes the multi-branched structure 10 of the present invention aesthetically pleasing and attractive.

In accordance with the present invention, the plurality of optical fibers 12 are supported and confined by spirally wrapping a bendable wire 28 around and along the optical fiber bundle 12. By "bendable" it is meant what while the wire can easily be bent by the person constructing the decorative structure 10, the spirally-wound wire nonetheless retains its shape and rigidity once it is bent into a particular configuration. Thereafter, it can once again be bent into a new shape or configuration if desired by the user.

Referring additionally to FIG. 2, the multiple-branch appearance is accomplished by branching off subgroups or pluralities of optical fibers 30 from the main group of optical fibers 12. The sub-groups 30 branch off from the main group of optical fibers 12 between the adjacent segments of the spirally wound support wire 28 as shown. The sub-group of optical fibers 30 are supported and confined in the same manner as the main group of optical fibers 12. Thus, a bendable wire 28 is likewise spirally wound around the sub-group 30 of optical fibers. In a similar manner, other branches or sub-branches may be supported and confined by such a spirally wound wire 28.

Of course, it is not necessary for all of the branches of optical fibers to be so supported and confined. Thus, for example, additional sub-groups of fibers 32 may branch off from a main or sub-branch of the optical fibers and be allowed to fall freely according to their natural shape.

The bendable wire 28 used to support and confine the sub-groups of optical fibers 30 forming the branches of the decorative structure 10 begins at the junction between the sub-group and the main group of optical fibers. If additional strength is desired or required, an end 34 of the spirally wound wire 28, which is substantially linear for an inch or two, can be inserted within the optical fiber bundle 12. However, this is not required and where it is particularly desirable to prevent any damage to the optical fibers themselves, the spiral wire 28 need only be wrapped around the optical fibers 30 forming the branch.

In most cases, to give a more aesthetic appearance, an outer covering or sheath 36 can be wrapped around the outside of the trunk and branches forming the decorative structure 10. Where a tape's adhesive does not chemically attack the optical fibers themselves, tape can be used to perform this function. However, cloth or paper wrappings can be used in lieu of tape if desired.

For purposes of illustration, not all of the branches have been shown with the decorative outer sheath 36. This has been done to more clearly show the construction of the decorative structure 10 in accordance with the present invention. In an actual application of the decorative structure 10, however, the decorative sheath 36 is normally used to cover all of the branches supported by the spirally wound, bendable wire 28.

Since the wire 28 is wound around the circumference of the optical fibers, additional protection and support is provided compared with prior art decorative structures of the type previously described. It can also be seen that the entire multiple-branch tree can be assembled in accordance with the present invention without the use of any tape or other adhesive. While tape can be used to cover the assembled tree, this is optional and it is required only for aesthetic reasons.

Since the wire chosen is bendable, as defined previously, the user may redesign and reshape the branches forming the decorative structure 10 as he pleases. All that is necessary is that the user bend a branch or branches into the shape which pleases him. The branches will then retain their new position.

The multiple-branched structure 10 is essentially in its final form at the time that all of the branches have been supported and confined by the spirally bendable wire, at the time that the outer decorative sheath is added. As a result, the construction of the tree is made easier and the final product is generally more likely to have a "professional" appearance than with prior art decorative structures of this type.

The bendable support and confining wires 28 can be made out of any material which is capable of being bent and thereafter retaining its shape. Thus, steel, copper or aluminum wire is adequate for this purpose. The optical fibers in the particular embodiment illustrated are made with a central core formed of a polystyrene having an index of refraction of about 1.6 and having an outer sheath formed of polymethylmethacrylate having an index of refraction of about 1.49. Such optical fibers are readily available and are made in accordance with well-known techniques.

What is claimed is:

1. A decorative structure comprising:
   a. a light source;
   b. a plurality of optical fibers having one end thereof grouped together;
   c. means for mounting said grouped end of said optical fibers in proximity with said light source whereby light is transmitted into said grouped end and thereafter through said optical fibers;
   d. means for supporting and confining said plurality of optical fibers comprising a bendable wire spirally wound around said plurality of optical fibers beginning at said grouped end;
   e. additional means for supporting and confining subgroups of optical fibers branching off from said plurality of optical fibers, said additional means also comprising bendable wires spirally wound around said sub-groups; and
   f. wherein said adjacent segments of said spirally wound wire are spaced apart so that sub-groups of optical fibers can extend therebetween.

2. A decorative structure as in claim 1 wherein said bendable wires comprising said additional supporting and confining means are terminated by substantially linear end segments which are inserted within the plurality of optical fibers for support.

3. A decorative structure as in claim 1 wherein said plurality and sub-groups of optical fibers supported by said spirally wound bendable wires are sheathed in a decorative outer cover.

4. A decorative structure as in claim 3 wherein said outer cover comprises adhesive tape.

5. In a decorative structure comprising a plurality of optical fibers arranged in sub-groups to form a plurality of branches and sub-branches, and wherein one end of said plurality of optical fibers is placed within proximity of a light source, an improved method of supporting said optical fiber branches and sub-branches comprising the steps of arranging said optical fibers into branches and sub-branches; spirally winding bendable wire supports around and along said branches and sub- branches to confine and support the same; and wherein said adjacent segments of said spirally wound wire are spaced apart so that sub-branches of optical fibers can extend therebetween.

\* \* \* \* \*